United States Patent
Chitre et al.

(10) Patent No.: US 9,295,087 B2
(45) Date of Patent: Mar. 22, 2016

(54) MOBILE DEVICE SMART BUTTON THAT ADAPTS TO DEVICE STATUS

(71) Applicant: Cellco Partnership, Basking Ridge, NJ (US)

(72) Inventors: Monica Chitre, Watchung, NJ (US);
Yoganand Rajala, Suwanee, GA (US);
Peter C. Bates, Morristown, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/056,392

(22) Filed: Oct. 17, 2013

(65) Prior Publication Data

US 2014/0106699 A1 Apr. 17, 2014

Related U.S. Application Data

(60) Provisional application No. 61/715,257, filed on Oct. 17, 2012.

(51) Int. Cl.
| | |
|---|---|
| *H04M 11/04* | (2006.01) |
| *H04W 76/00* | (2009.01) |
| *H04W 76/04* | (2009.01) |
| *H04W 76/02* | (2009.01) |

(52) U.S. Cl.
CPC .......... *H04W 76/007* (2013.01); *H04W 76/045* (2013.01); *H04W 76/028* (2013.01)

(58) Field of Classification Search
CPC ............................... H04W 76/007; H04W 4/22
USPC ..................... 455/404.1, 521, 575.1
See application file for complete search history.

(56) References Cited

U.S. PATENT DOCUMENTS

| | | | |
|---|---|---|---|
| 5,600,706 A | 2/1997 | Dunn et al. | |
| 5,689,548 A * | 11/1997 | Maupin et al. | ............. 455/404.1 |
| 7,254,404 B2 | 8/2007 | Van Diggelen et al. | |
| 7,333,818 B2 | 2/2008 | Dunn | |
| 7,587,031 B1 * | 9/2009 | Ress et al. | ........................ 379/45 |
| 7,991,382 B1 | 8/2011 | Gunasekara | |
| 8,135,413 B2 | 3/2012 | Dupray | |
| 8,369,266 B2 | 2/2013 | Jin et al. | |
| 8,811,964 B2 | 8/2014 | Fish et al. | |
| 2002/0065063 A1 * | 5/2002 | Uhlik et al. | ................... 455/404 |
| 2005/0085257 A1 | 4/2005 | Laird et al. | |
| 2005/0153681 A1 | 7/2005 | Hanson | |
| 2012/0028597 A1 | 2/2012 | Chmielewski et al. | |
| 2012/0052836 A1 * | 3/2012 | Buratti et al. | ............. 455/404.2 |
| 2012/0307621 A1 * | 12/2012 | Zawaideh et al. | ............. 370/216 |
| 2013/0122932 A1 | 5/2013 | Patel et al. | |
| 2013/0244608 A1 * | 9/2013 | Malik et al. | ................ 455/404.1 |
| 2013/0324154 A1 | 12/2013 | Raghupathy et al. | |
| 2014/0295894 A1 | 10/2014 | Annamalai | |
| 2014/0376414 A1 | 12/2014 | Edge et al. | |
| 2015/0098494 A1 | 4/2015 | Van Den Dungen | |
| 2015/0133090 A1 | 5/2015 | Edge et al. | |
| 2015/0140951 A1 | 5/2015 | Darling | |
| 2015/0230055 A1 | 8/2015 | Smith et al. | |

* cited by examiner

*Primary Examiner* — Temica M Beamer

(57) ABSTRACT

A method of establishing a persistent emergency call and positional indication of the call is provided. Upon a call center receiving a call by a user equipment (UE) device initiated by activation of a smart button, the call center issues a request for a current location. If the call is inadvertently terminated by the user prior to the emergency being cleared, the UE device, attempts to reestablish the call automatically and continually. Prior to initiating the call, if the UE device is in airplane mode or standby mode, these modes are automatically switched off and location services are enabled.

20 Claims, 7 Drawing Sheets

MOBILE DEVICE SMART BUTTON THAT ADAPTS TO DEVICE STATUS

BACKGROUND

In recent years, mobile devices have increasingly provided users with an elevated level of safety and security. In addition to being able to wirelessly contact another individual or service by dialing a number, mobile devices can be used as part of a Personal Emergency Response Systems (PERS). PERS devices and equipment are user-installed devices (wired or wireless) that may also attach to a landline network. The general concept is that the PERS user is able to provide location information for general monitoring and/or to alert an emergency response call center that they are in distress and need immediate assistance. Some PERS devices are capable of detecting events such as falls or extended periods of inactivity and alert the call center to these conditions. Regardless of the specific type of PERS device, the location of the mobile device is an important determination.

In modern mobile communication networks, the current position determination technologies use several methods of determining a subscriber's location before it defaults to the location of the serving sector. One such technology is Global Positioning System (GPS). GPS is a space-based satellite navigation system that provides location and time information anywhere on Earth, where there is an unobstructed line of sight to four or more GPS satellites. Standalone GPS operation uses radio signals from satellites alone. On the other hand, Assisted GPS (AGPS) additionally uses network resources to locate and use the satellites in poor signal conditions. For example, when signal conditions are poor (e.g., in a city or building), these signals may suffer multipath propagation where signals bounce off buildings, or may be weakened by passing through atmospheric conditions, walls, or tree cover. When a GPS location determination is attempted in these conditions, some standalone GPS navigation devices may not be able to fix a position due to the poor signal quality. A fix may take several minutes (if at all possible) rendering them unable to function effectively until a clearer signal can be received continuously for a long enough period of time. An assisted GPS system can address these problems by using data available from a network. For example, servers that include orbital information from satellites are used. A mobile device can contact such servers and download the information using a "secure user plane location" approach, which is an IP based protocol for AGPS to receive information of GPS satellites via IP.

Determining the location of a mobile device while the mobile device is in use is often problematic. A mobile device may not be able to be assisted in determining its location because the communication channel is preoccupied with voice communication. Put differently, some wireless technology, (e.g., CDMA) does not support simultaneous voice and IP data communication. Thus, the call would first have to be stopped in order for the mobile device to determine its location efficiently.

Accordingly, it would also be beneficial to have a method and system to determine the location of a mobile device while a mobile device is in use, without providing an impression to the user that an on-going call is severed.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to determining and/or tracking the location of a mobile device. Different localization techniques are used to determine the location of the mobile device. The location information is then transmitted to a central server. Although the examples describe location determination, the systems described herein may also be used to enable placement of an emergency or priority call using a single button or sensor output, collectively referred to herein as a "smart button." When the button or sensor is actuated, a smart button function is initiated which causes the system to determine the state of the mobile device, change the state, as needed, to support the call and then persistently initiate the call. These changes may include automatically turning off an "airplane mode" of the device, switching on GPS functions and switching the device from a standby mode to an active mode. After the call is established, the function performed in response to actuation of the smart button may change, for example to prevent the call from being terminated until the emergency is cleared. While the emergency call is in progress, the smart button function may block other calls from being received or made by the device. Calls made to the device while the smart button function is active may be automatically directed to the user's voice mail box and/or may cause a specific message based on the emergency call to be played for the caller. In addition, once a call is initiated using the smart button, if it is terminated while the emergency is still active, the mobile device will automatically attempt to reconnect until the call is reestablished or the emergency is cleared. The smart button function is terminated by personnel at the central server when they determine that the emergency is no longer active or by the user or a first responder entering a predetermined DTMF code to indicate that the emergency has passed. Once the emergency has passed, the smart button function returns the device to its previous state and informs the user of any calls received during the emergency.

Figure 1:
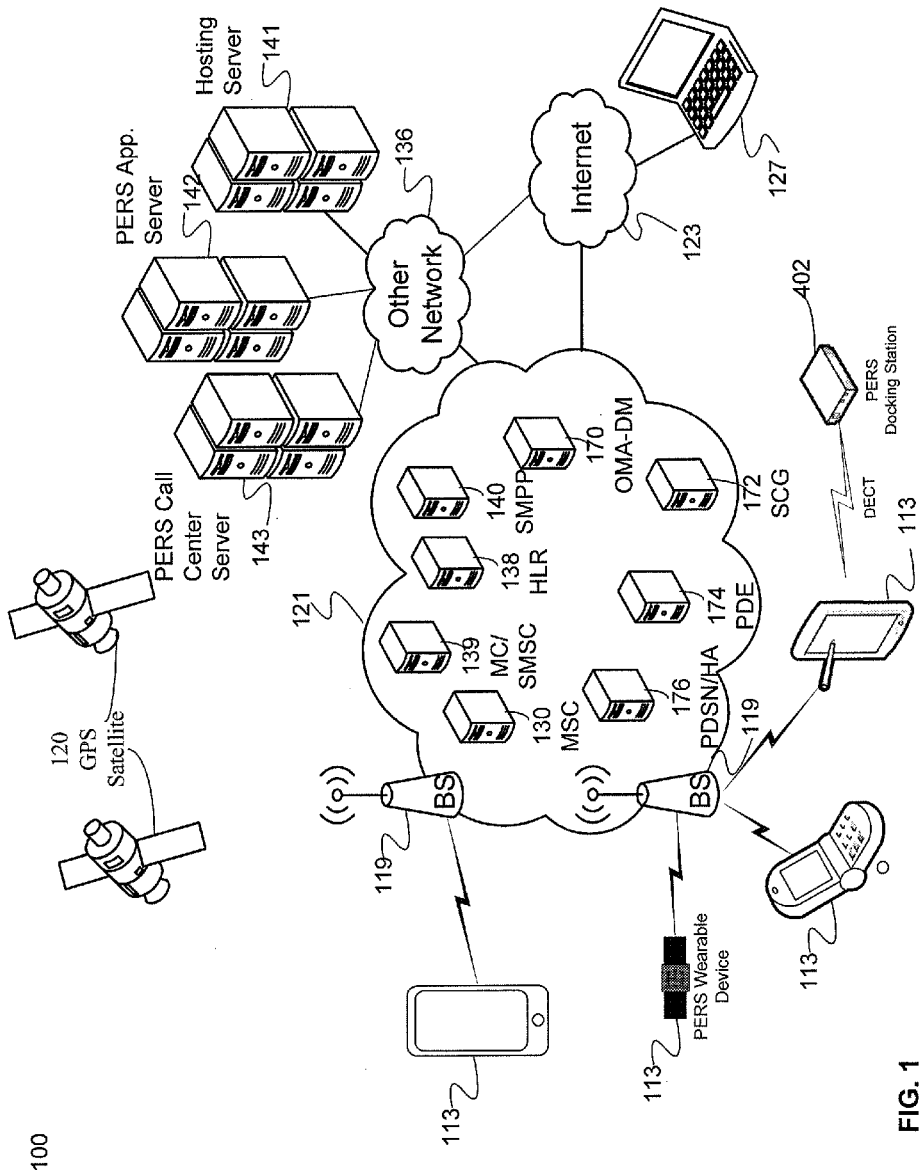
FIG. 1 illustrates a system offering an exemplary framework to determine the location of a mobile device.

Reference now is made in detail to the examples illustrated in the accompanying drawings and discussed below. FIG. 1 illustrates a mobile communication network 100 as may be operated by a carrier or service provider to provide a wide range of mobile communication services and ancillary services or features to its subscriber customers and associated mobile device users. The elements collectively indicated by the reference numeral 100 generally are elements of the network and are operated by or on behalf of the carrier and third party service provider, although the mobile devices may be sold to and owned by the carrier's customers. The mobile communication network 100 provides communications between mobile devices as well as communications for the mobile devices with networks and stations (not shown) outside the mobile communication network 100.

The wireless mobile communication network 100 might be implemented as a network conforming to the code division multiple access (CDMA) IS-95 standard, the 3rd Generation Partnership Project 2 (3GPP2) wireless IP network standard or the Evolution Data Optimized (EVDO) standard, a time division multiple access (TDMA) standard or other standards used for public mobile wireless communications. In one example, the mobile devices may be capable of conventional voice telephone communications and data communications.

For purposes of later discussion, several user equipment (UE) or mobile devices 113 appear in the drawing, to represent examples of the UE devices that may receive various services via the mobile communication network 100. In the materials that follow, the terms UE device and mobile device are used interchangeably and include a wearable PERS device. UE devices 113 can take the form of portable handsets, smart-phones, tablets, personal digital assistants, or mobile devices 113, although they may be implemented in other form factors. In one example, mobile devices 113 can include media content. The media content can be configured to execute on many different types of UE devices 113. For example, a mobile device application can be written to execute on a binary runtime environment for mobile (BREW-based) UE device. In further instances, a mobile device application can be written to execute on a Windows Mobile based mobile device, Android, I-Phone, Java Mobile, or RIM based mobile device such as a BlackBerry or the like. UE devices 113 may also represent examples of PERS wearable devices. In one example, a PERS wearable device may be configured to have a help button on the device and a user of the PERS wearable device 113 may call the personal emergency response system by pressing the help button in an emergency state. Help may also be invoked through an audio input of the PERS wearable device 113, or based on a predetermined motion of the device or any combination thereof.

The mobile communication network 100 can be implemented by a number of interconnected networks. Hence, the overall network 100 may include a number of radio access networks (RANs), as well as regional ground networks interconnecting a number of RANs and a wide area network (WAN) interconnecting the regional ground networks to core network elements. A regional portion of the network 100, such as that serving mobile devices 113, can include one or more RANs and a regional circuit and/or packet switched network and associated signaling network facilities.

Physical elements of a RAN operated by one of the mobile service providers or carriers include a number of base stations represented in the example by the base stations (BSs) 119. Although not separately shown, such a base station 119 can include a base transceiver system (BTS), which can communicate via an antennae system at the site of base station and over the airlink with one or more of the mobile devices 113, when the mobile devices are within range. Each base station can include a BTS coupled to several antennae mounted on a radio tower within a coverage area often referred to as a "cell."

The BTS is the part of the radio network that sends and receives RF signals to/from the mobile devices 113 that are served by the base station 119.

The radio access networks can also include a traffic network represented generally by the cloud at 121, which carries the user communications and data for the mobile devices 113 between the base stations 119 and other elements with or through which the mobile devices communicate. In some examples, the mobile traffic network 121 includes network elements that support mobile device media content transfer services such as mobile switching centers (MSCs) 130, Open Mobile Alliance (OMA) Device Management (DM) Working Group and the Data Synchronization (DS) Working Group servers 170. The network can also include other elements that support functionality other than media content transfer services such as messaging service messages and voice communications. Examples of other network elements that may be used in support of messaging service message communications include, but are not limited to, message centers (MCs) 139, home location registers (HLRs) 138, simple messaging service point-to-point (SMPP) gateway 140, and other network elements such Service Control Gateway (SCG) 172, Position Determining Entity (PDE) 174, and gateway Packet Data Serving Node/Home Agent (PDSN/HA) 176. The PDE 174 communicates with an appropriately equipped mobile device 113 to determine the location of the mobile device 113, and for non-emergency services, a Location gateway (LGW) (not shown) makes that information accessible to various user applications, including some applications that reside on mobile stations. Hence, the location determination software in the mobile device 113 enables that station to obtain the location information by working with elements of a location based service (LBS) platform of the mobile wireless communication network, such as the PDE 174.

Thus, the PDE 174 is a network element that manages the position or geographic location determination of each mobile device 113. In some examples, network 100 utilizes an assisted GPS (AGPS) approach to the determination of mobile station location, in which the mobile device 113, takes measurements of signals from a number of GPS satellites 120 (only two of which are shown, for convenience) and interacts with the PDE 174 to process those measurements so as to determine the latitude and longitude (and possibly altitude) of the current location of the mobile device 113. The PDE system 174 is essentially a general purpose programmable device with an interface for data communication via the network 121 running server software and running programming for implementation of the PDE functions. The PDE 174 stores (e.g., in cache memory) or has access to a complete and up to date set of the satellite data for the constellation of GPS satellites 120 needed to allow computation of position based on pseudorange measurements from satellite signals. The data may include that associated with the entire constellation but will at least include the data for the satellites expected to be broadcasting into the geographic region serviced by the network 121.

When a mobile device 113 attempts a GPS position fix, the mobile device 113 provides information allowing the PDE 174 to perform a pre-fix. Typically, the mobile device 113 will provide data identifying the base station 119 through which it is receiving service (and possibly the serving sector). In some implementations, the PDE 174 may receive data regarding several base stations/sectors and signal strengths thereof, for trilateration. The PDE 174 uses information about base station location(s) to process the data received from the mobile device 113 so as to determine a region (e.g., area of the cell or sector, or a general area triangulated based on signals from several base stations) that the mobile device is likely located within. The PDE 174 then uses the pre-fix location to parse the satellite data down, to assistance data that the mobile device 113 at the particular location needs in order to take GPS readings. The PDE 174 sends the parsed satellite data to the mobile device, e.g., to target mobile device 113, for use in taking measurements of signals from appropriate satellites 120. The GPS assistance data may contain selected satellite almanac, satellite visibility, Doppler, and clock correction information.

The mobile device 113, in turn, uses this information (also known as acquisition assistance records) to take multiple satellite pseudorange measurements. Depending on the device/network configuration, the mobile device 113 or the PDE 174 can then calculate a final fix using these pseudorange measurements. The final fix computation provides latitude and longitude (and possibly altitude) coordinates for the current location of the mobile device 113. If the mobile device 113 has full GPS computation capability, the station 119 would know its current latitude and longitude and would communicate that data to the PDE 174 through the network 121. In many cases, however, the mobile device 113 has only measurement capability, and the mobile device forwards the measurement data to the PDE 174 to determine the final fix. In either case, the GPS processing leads to a situation in which the PDE 174 knows the latitude and longitude of the mobile device 113. If necessary, the PDE 174 can provide coordinates to the mobile device 113.

As to the SCG 172, it functions to allow software applications, e.g., third-party applications (shown by servers 141 to 143), to send requests to locate mobile devices 113. Such software applications can be resident on the mobile device 113 itself or resident on another platform.

As mentioned above, the network 121 also includes one or more of Packet Data Serving Nodes or "PDSNs" 176. The PDSN 176 is a fixed network element introduced in the architectures for 3G networks, to support packet-switched data services. Each PDSN 176 establishes, maintains and terminates logical links to the associated portion of the radio access network 121. The PDSNs also support point to point (PPP) sessions with the mobile devices 113. The PSDNs 176 provide the packet routing function from the radio network to/from other packet switched networks, represented generally by the other network 136 and the Internet 123, in FIG. 1.

Figure 2:
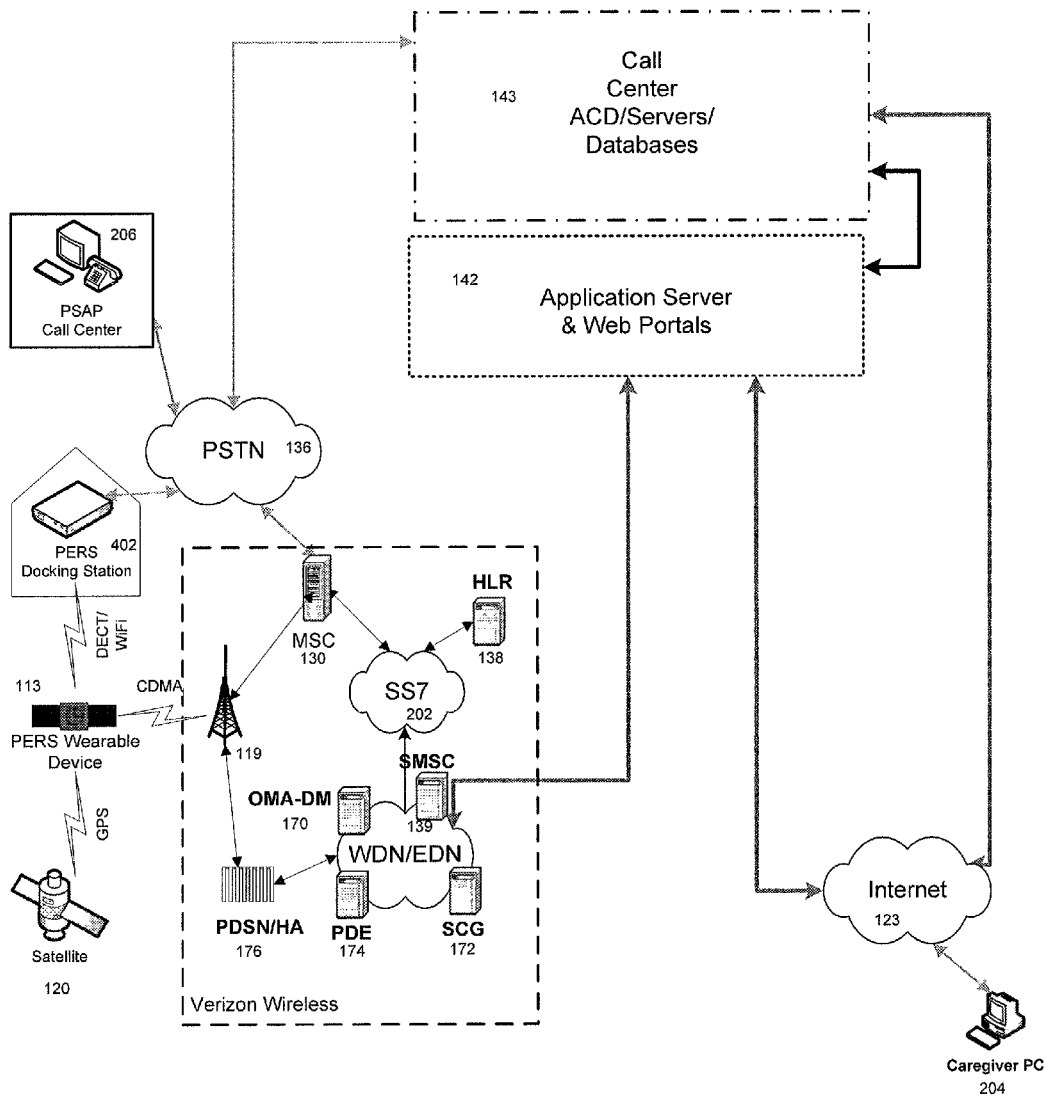
FIG. 2 illustrates a more detailed view of system offering an exemplary framework to determine the location of a mobile device.

Other individual elements such as switches and/or routers forming the traffic network 121 are omitted here for simplicity. It will be understood that the various network elements can communicate with each other and other aspects of the mobile communications network 110 and other networks, e.g., the public switched telephone network (PSTN) 236 as shown in FIG. 2, and the Internet 123, either directly or indirectly.

The mobile switching center (MSC) 130 is responsible for managing communications between the mobile device and the other elements of the network 110. In addition, the MSC 130 is responsible for handling voice calls and messaging service message requests as well as other services (such as conference calls, FAX and circuit switched data, messaging service communications, Internet access, etc.). The MSC 130 sets up and releases the end-to-end connection or session, and handles mobility and hand-over requirements during the call. The MSC 130 also routes messaging service messages to/from the mobile devices 13, typically from/to an appropriate MC 139. The MSC 130 is sometimes referred to as a "switch". The MSC 130 manages the cell sites, the voice trunks, voicemail, and SS7 links 202, as shown in FIG. 2.

In one example, the message center (MC) 139, in some examples, allows messaging service messages to be exchanged between mobile telephones and other networks. For SMS messaging, for example, the MC 139 receives packet communications containing text messages from originating mobile devices and forwards the messages via the signaling resources and the signaling channels to the appropriate destination mobile devices. The MC 139 may receive messages from external devices for similar delivery to mobile devices, and the MC 139 may receive similar messages from the mobile devices and forward them to servers or terminal devices, in either case, via an Internet Protocol (IP) packet data network.

In some examples, the MC 139 can also be considered or include functionality that may be considered that of a Short Messaging Service Message Center (SMSC) or a Message Register (MR). Wireless carriers developed the short message service (SMS) to transmit text messages for display on the mobile devices. In many existing network architectures, the SMS traffic uses the signaling portion of the network 121 to carry message traffic between a Short Message Service Center (SMSC) 139 and the mobile devices. The SMSC 139 supports mobile device to mobile device delivery of text messages. However, the SMSC 139 also supports communication of messages between the mobile devices and devices coupled to other networks. For example, the SMSC 139 may receive incoming IP message packets from the Internet 123 for delivery via the network 121, one of the base stations 119 and a signaling channel over the air link to a destination mobile device. For this later type of SMS related communications, the network 110 also includes one or more Short Message Peer-to-Peer (SMPP) protocol gateways 140.

In other examples, the MC 139 can include functionality related to the Enhanced Messaging Service (EMS) or Multimedia Messaging service (MMS). An EMS message can have special text formatting (e.g., such as bold or italic), animations, pictures, icons, sound effects and special ring tones. MMS messages support the sending and receiving of multimedia messages (e.g., images, audio, video and their combinations) to (or from) MMS-enabled mobile devices. In some examples, the MC 139 can be considered in whole or in part a multimedia messaging service center (MMSC).

Although a single MC 139 is shown, network 100 can have many geographically dispersed MCs 139. The MCs 139 can include destination routing tables (DRTs). In essence the DRTs are databases within the MCs 139. A DRT contains a list of the MDNs which are associated with the various MCs 139. For example, a first MDN is associated with a MC 139 in California while a second MDN is associated with a MC 139 in Virginia. The DRTs are used to determine which MC 139 should attempt to deliver an incoming messaging service message to the destination MDN. For example, if a user associated with the MC in California sends an SMS to a user associated with the MC 139 in Virginia, the California MC 139 sends the SMS to the Virginia MC 139 for delivery to the destination MDN. The communication among the MCs 139 occurs using know protocols such SMPP and the like.

The HLR 138, in some examples, stores a subscriber profile for each of the wireless subscribers and their associated mobile devices 113. The HLR 138 may reside in an MSC 130 or in a centralized service control point that communicates with the MSC(s) 130 via an out-of-band signaling system such as an SS7 network 202 as shown in FIG. 2. The HLR 138 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 138 can also be a stand-alone device. The HLR also tracks the current point of attachment of the mobile device to the network, e.g., the identification of the MSC 130 with which the mobile device is currently registered to receive service.

The SMPP gateway 140 provides functionality to transport messaging service messages to other mobile communication networks and also receive messaging service messages from other networks. The SMPP gateway 140 supports communications using the SMPP protocol. SMPP gateways 140 are Short Message Peer-to-Peer (SMPP) gateways 140 used to connect the wireless communication network (such as an Internal Protocol IP network on the left of the SMPP Gateway 140 in FIG. 1) to another network (such as a public Internet network on the right of the SMPP Gateway 140 in FIG. 1). The SMPP Gateway 140 allows the MC 139 to receive and send messages in IP packet format. The SMPP Gateway 140 is an entity within the wireless network 100 that acts as an intermediary between the wireless service provider network and other networks. For example, the SMPP Gateway 140 converts messages in protocol(s) used by other applications and devices, e.g. Extensible Markup Language (XML), Hypertext Mail Protocol (HTMP), etc., to and from the SMPP protocol. The SMPP messages ride on IP transport, e.g., between the SMPP Gateway 140 and the MC 139.

In addition, the traffic network portion 121 of the mobile communications network 100 connects to the other network 136. The other network in one example, may be a private data network. The private data network connects to the traffic network portion 121 via a gateway (not shown). The gateway can provide protocol conversions between the protocols used by the traffic network 121 and the protocols used by the private data network 136.

The private data network 136 can be in communication with various auxiliary services servers, e.g., such as those providing additional services to the users of the network 100, and/or to operations support personnel of the service provider or carrier that operates the network 100. For example, the carrier can also offer its subscribers on-line access to a variety of functions related to the subscribers' accounts, such as a log of location information, personal health information personal information, account information (e.g., passwords, preferences, etc.) or the like. For that purpose, the carrier can operate a "PERS Call Center" server 143 via the other network 136. Hence, a user's terminal, such as PC 127, may be used to access on-line information about a subscriber's account, which the mobile carrier makes available via the carrier's web site accessible through the Internet 123. In one example other network 136 is part of the Internet 123.

In addition, a "PERS Application" server 142, and a hosting server 141 can be provided in communication with the private data network 136. For example, the PERS Application server 142 can provide settings, mobile device events (e.g., when an emergency occurred), location history information of the mobile device 113, and the like. The hosting server 141 is a caregiver portal application and troubleshooting portal application hosting server. For discussion purposes, each of the hosting 141, PERS Application, and Call Center Server can be a standalone computing device such as a server or be on a single server. Thus, the functionality described herein with respect to each of the servers 141, 142, and 143 can also be provided by one or multiple different computing devices.

FIG. 2 provides a high level description of an exemplary framework to determine the location of a mobile device.

In one example, mobile device 113 may initiate a call to the call center requesting emergency services. The wireless network (e.g., carrier's wireless communication network) may relay the call to the call center via the PSTN network 236, as shown in FIG. 2.

The App server 142 may record and update the status of the call upon receiving an indication from the call center server 143. Upon establishing a connection to the call center, caregiver PC 204 or an agent may be notified of the established call and may then request a location of the mobile device via Internet 123. Upon receiving the request, the mobile device may first perform a GPS fix using data from satellite 120. However, the satellite signal may be poor, due to obstructions such as large buildings, trees, etc. An assisted GPS (AGPS) system can address these problems by using data available from a network (e.g., the carrier's wireless communication network). Thus, the mobile device may rely on AGPS using wireless network resources to help the mobile device determine the mobile device location. For example, servers (e.g. PDE 174) in the network that include almanac and ephemeris data for the satellites may be used. Mobile device 113 may contact the servers and download the information. The mobile device will still receive at least some GPS satellite signals for processing to determine location, however, the network assistance may help expedite final resolution of device location and/or a reasonably accurate determination using fewer or weaker received satellite signals. In one example, both GPS and AGPS may fail to provide the location information because of a substantial degradation of signals. In such a scenario, if the user of the mobile device is in the vicinity of docking station 402, the user then provides the location or the registered address of the docking station.

In one implementation, the mobile device may be a PERS wearable device 113 (as discussed above). As such, an emergency situation such as a heart attack, a collision or a fall or GPS coordinates corresponding to a danger zone, detected at the PERS wearable device, may automatically initiate a call to the call center.

The user of the caregiver PC 204 or an agent may then access the location information via a global information network (e.g., the Internet 123) from the call center server. In one example, the call center agent may also receive personal information about the user of the mobile device and a coarse location of the mobile device 113 (e.g., based on the wireless network cell sector address) that may be used to select a Public Safety Answering Point (PSAP) call center 206. For example, the personal information may be stored in a database (e.g., a public database or a private database) of the server. The database may be created during an initial service setup between the call center and the user. During the setup, a user identification value may be obtained from the user and stored in the database. This value may be used later to index the database in order to retrieve the user's stored personal information. For example, the agent of the caregiver PC 204 may have the telephone number of the PSAP call center 206 based on the location personal information and the coarse location of the user. The agent may contact the PSAP call center in order to relay the status (e.g., an emergency situation) and location of the user to a PSAP operator, so that the PSAP operator can provide immediate support to the user. In one example, the PERS device may also communicate with an accessory, such as a heart monitor, associated with the user, which may already have the user identification. This communication may be implemented by the PSAP call center engaging a "pseudo hold" mode, as described below, and establishing an internet protocol (IP) session with the mobile device 113. Thus, upon communicating with the accessory (e.g., the heart monitor), the PERS device may acquire the user identification and transfer the user identification to the call center. In such a scenario, the PERS device may not store the user identification.

Figure 3:
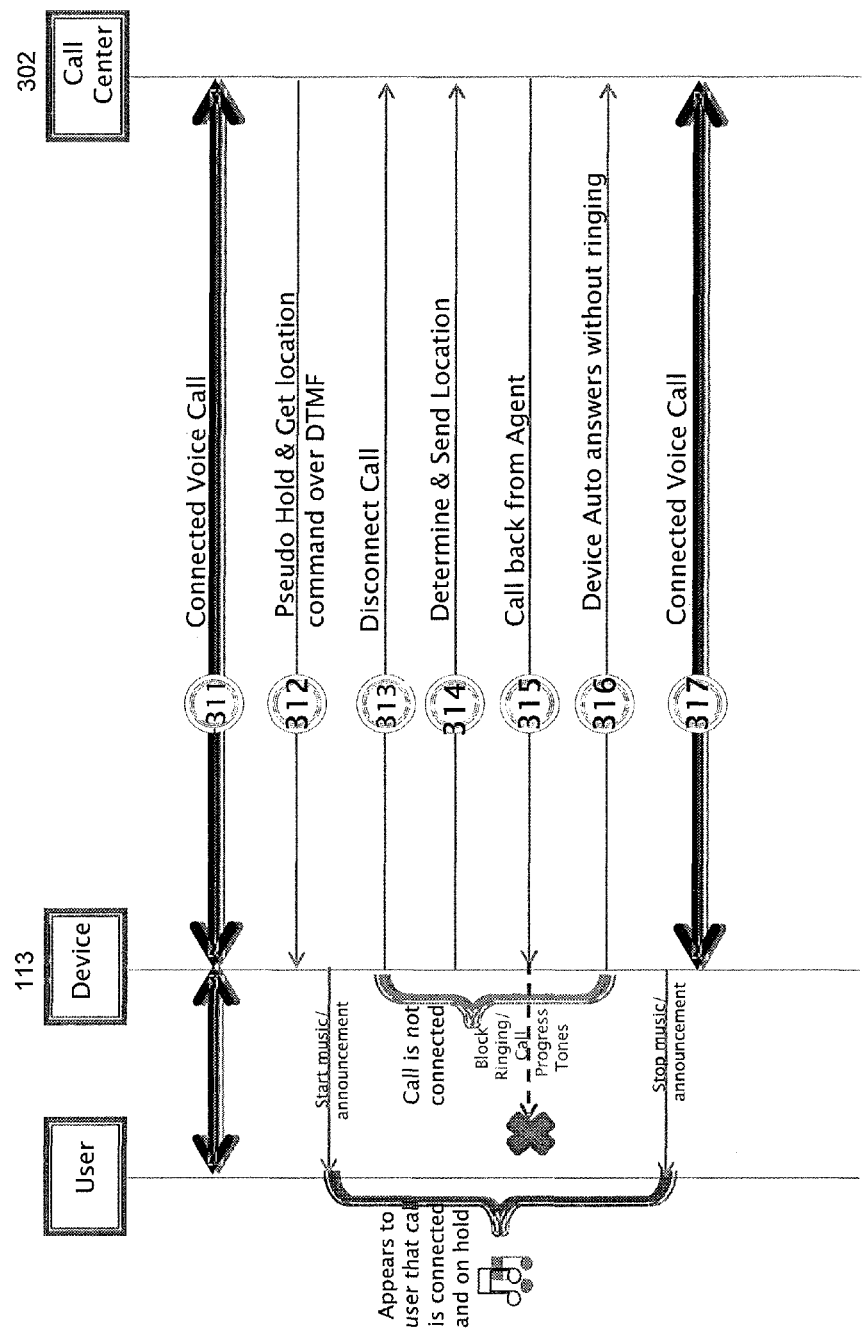
FIG. 3 illustrates a simplified exemplary flow between a mobile device and a call center.

With the foregoing overview of the system, it may be helpful now to consider usage of a pseudo-hold technique to permit functions to be performed and results to be reported using a mobile device in which the functions (and perhaps results) are inconsistent with a voice call initiated through the mobile device. One high-level example includes determining the location of a mobile device 113 in different scenarios. FIG. 3 illustrates a simplified exemplary flow between a mobile device 113 and a call center 302.

In step 311, the wireless device 113 is initially connected with the call center in an end to end voice call. In another example, a voice connection may be initially setup automatically between the wireless device 113 and the call center. This may take place when the wireless device senses a motion (e.g., a sudden acceleration indicating an emergency situation such as a collision or a fall). Alternatively, the voice call may be manually triggered by the user.

During the voice call, the call center personnel may want to determine the location of the mobile device (e.g., to track the location of the user). This request may be generated by the mobile device (when a predetermined criterion is met). For example, the mobile device 113 may periodically send such information to the call center based on a prior configuration of the PERS service. In another example, the predetermined criterion of the mobile device 113 may be a perceived incident (e.g., fall, collision, etc., based on various sensors on the mobile device 113). In another example, the request to determine the location information (and/or to send the location information to the call center 302) may be initiated by the user of the mobile device. In yet another example, the call center 302 itself may initiate the request to receive the location information from the mobile device 113. In this example, an assumption is made that Standalone GPS operation is not appropriate for reasons discussed above. In this regard, Assisted GPS (AGPS) would be more appropriate to determine the location of the mobile device. However, since there is a voice call in progress, whether or not a completed connection to the call center has been established, such GPS assistance cannot be readily provided. In yet another example, the call center may want to access physiological or environmental data for the caller that is available through the mobile device but that cannot be accessed while the voice call is active. In this instance, the call center may initiate a pseudo-hold operation, and while the voice call is temporarily terminated by the pseudo-hold, initiate an Internet Protocol (IP) session with the mobile device to access the physiological or environmental data. Example physiological data may include data such as heart rate, blood pressure or blood-sugar level. Example environmental data may include ambient sounds or images from the camera of the mobile device.

In general, the function performed by the mobile device, is not limited to location determination. Rather, the requests may be for different functions that may be completed by the mobile device. That is, the function may constitute first executing it in the mobile device and, optionally, sending a result to the call center. Alternatively, the function may entail temporarily interrupting a call with another party to perform a function requiring use of the mobile device incompatible with continuing the call, such as determining the health status of the caller or performing an Internet search using the communications channel as an Internet Protocol (IP) data channel. Some example functions are: sending physiological data on the caller that is available to the mobile device, searching the Internet using a mobile web browser, sending an image taken with a camera of the mobile device, and sending audio recorded with the mobile device's microphone. For example, the call center of an insurance company may request the mobile device to send an image of a specific incident (e.g., a picture of the user and/or the user's damaged property to an insurance adjustor at the time of the incident). In another example, the call center may request the application running on the mobile device to send recorded sound of an emergency incident at the time of the incident.

In step 312, the call center 302 issues a command to the mobile device from (e.g., from the call center application portal) to determine the network assisted location (AGPS) of the mobile device 113. For example, the request is translated into a Dual tone multi frequency (DTMF) command, which is a tone played in the voice channel for the device. The DTMF command, may be a combination of keys, for example, '*80'. Different combinations of keys may execute different functions in the mobile device.

These functions may include initiating the pseudo-hold mode, acknowledging receipt of a pseudo-hold command and acknowledging termination of a pseudo-hold mode. The acknowledgements may be generated automatically by the application running on the mobile device, without user interaction. The key combinations sent between the call center and the mobile device may be audible to the user or may be masked by the application running on the mobile device. To prevent accidental initiation of a pseudo-hold, these codes may be longer and include multiple instances of the special tones such as "*" and "#,"

In step 313, upon receiving such a command, an application on the mobile device 113 enters a "pseudo hold," in which the voice call is temporarily terminated. In one example, music played on the mobile device 113 and/or an announcement is displayed on a user interface of the mobile device (e.g., "please hold while we determine your location"). In the background, the call is actually severed. However, the severed call is not apparent to the user of the mobile device 113. Instead, although the call is terminated by the call center or the application on the mobile device, it appears that the voice call is ongoing—but on hold while the device is determining the location information and sending it to the call center. This increases the convenience of the mobile device because the call is terminated and reestablished without user intervention, allowing the device to automatically interrupt a call to perform a function and then automatically resume the call. The entire process is essentially transparent to the user. Although the call is actually severed, the user may also be urged not to "disengage" the call by an audio message provided locally by the application to the user during the time that the voice call is terminated.

In step 314, once the application on the mobile device 113 determines that the call has been terminated, the application causes the mobile device 113 to initiate an AGPS Mobile Station Based (MS-B) location request to the Position Determining Entity (PDE) 174 (e.g., the network server that assists in the location determination). Again, AGPS is made possible because the communication channel is now clear due to the "pseudo hold" in effect. Accordingly, the communication between the mobile device and PDE may be via an Internet protocol (IP) session, for example using a secure hypertext protocol (https). Once the location (i.e., position of the mobile device 113) is determined by the mobile device 113 or a server in the network, a connection to the call center is set up and the location information is sent over IP to the call center 302. If the location is determined by the network server, it may be sent directly from the server to the call center so that the pseudo-hold may be terminated earlier.

In step 315, upon receiving the location information of the mobile device 113 (e.g., from the mobile device 113 over the IP channel), the call center 302 (e.g., in the call center application portal) initiates a call back to the mobile device 113. In one example, the call center, based on the user identification (e.g., a mobile device number MDN), performs a lookup for the device in the database of the server. Once a match is obtained, the call center then places the call to the specific device accordingly. This call placement is transparent to the user of the mobile device 113—i.e., the user does not know that the call was severed and reestablished. The location information may be matched with the mobile device 113 using a unique identifier associated with the mobile device 113 in the communication to the call center 302. The location information may further be stored in a server associated with the call center 302 for retrieval/automatic association with the call back to the mobile device 113 and display on a screen of a call center agent. This information may be used instead of using the location determination process described above if it is not stale (e.g., if the user is calling back within a short time period and there is no indication that the mobile device has been moved). The call center personnel may make this determination rather than the mobile device (or the application running on the mobile device may automatically determine that the previously supplied location can still be used and act appropriately).

The receipt of the location information may signal the call center that the pseudo hold is to be terminated. Alternatively, the mobile device 113 may send a separate signal to the call center to terminate the pseudo hold. If the call is between the mobile device 113 and another mobile device (not shown), a message, sent via the IP session, signaling that the function is complete may be sent between the mobile devices to indicate that the pseudo hold should be terminated.

In step 316, upon receiving the call, the call control application on the mobile device 113 automatically answers the call without an overt indication to the user (e.g., ringing the device or displaying any incoming call related indications). In one implementation, the application running on the mobile device may know the CID of the call center and, when the mobile device is in pseudo-hold mode, may examine the CIDs of incoming calls. When a call having the CID of the call center is received the application may automatically answer the call, and then terminate the pseudo-hold mode. Calls having other CIDs may be ignored by the application while the mobile device is in pseudo-hold mode.

For example, the time that a device may be in the pseudo-hold mode may be limited. Within that limited time, the device may only receive calls associated with the call center (e.g. having the known CID of the call center). As such, an indication in the mobile device of a call from the center may not be necessary. However, upon an expiration of the limited time, the mobile device may again receive incoming calls and an indication of such calls.

In step 317, the user continues the voice call on his/her mobile device 113. Thus, the location information of the mobile device 113 is determined and provided to the call center 302 without substantially interfering with an ongoing call. In various embodiments, the application may stop the mobile device 113 from responding to any incoming calls and/or the network block calls to the mobile device 113 in the event that calls are made to the mobile device 113 during the time period when the communication channel is not in use. For example, the mobile device, while in the pseudo-hold mode, may send a signal to the network indicating that it is in the pseudo-hold mode. The network may then respond to the signal by rejecting any incoming call directed to the mobile device. In another example, the network may divert the incoming calls directly to a voice mail box of the mobile device.

In general, the user interface of the mobile device indicates that the device is free to make another call even when engaged in a voice call. However, upon entering the pseudo hold mode, the device may execute a function (e.g., browsing the internet), as described above, and may need to use an IP data channel. Sending data over the IP data channel to the call center may conflict with the operation of the voice call. The voice call and the IP data channel may not operate simultaneously. As such, during the pseudo-hold mode, the voice call may be terminated for the data transmission.

The concepts embodied herein are also applicable in emergency situations. In one example, such monitoring may be part of a Personal Emergency Response System (PERS) that can be used for monitoring the location of subscribers and to respond to emergencies identified by the mobile device 113. For example, an emergency call signaled by a PERS subscriber with their mobile device (e.g., a mobile device 113) goes through several steps until the location of the mobile device is determined. In one example, the PERS system includes the mobile device 113, a coarse positioning process (e.g., similar to non-PERS 911 calls), a standalone position determining process, a more accurate AGPS position determining process, and verbal communication between PERS subscriber, a call center agent, and, sometimes, a Public Safety Answering Point (PSAP) Call Taker and/or other emergency medical service (EMS) personnel.

For example, four main position determining steps are used to determine the location (e.g., position information). Some of the factors for accuracy/responsiveness include the number of GPS satellites the mobile device 113 is in communication with, signal strength of the GPS signals, the proximity to the BS 119, and the time available for call center agent to assess and help with a developing situation.

Figure 4:
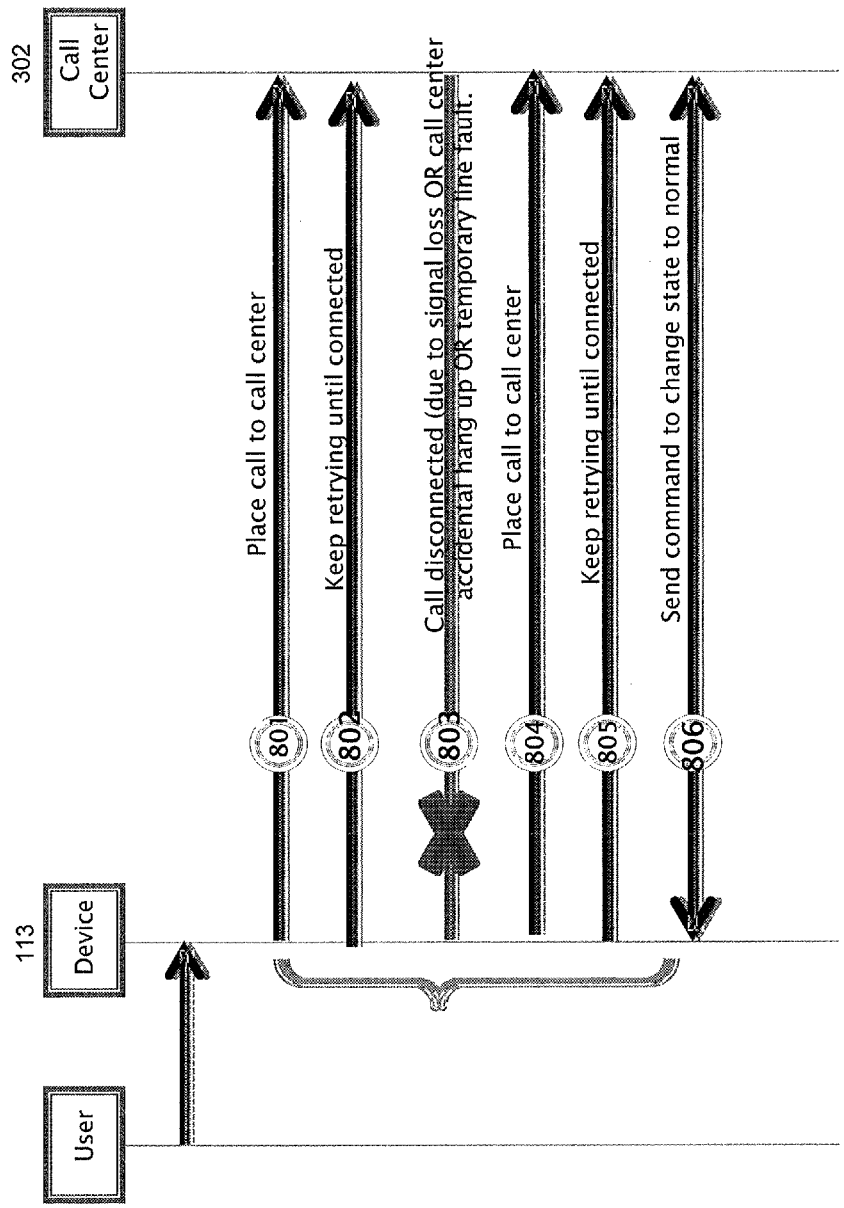
FIG. 4 illustrates an exemplary call flow having a persistent mode.
Figure 5:
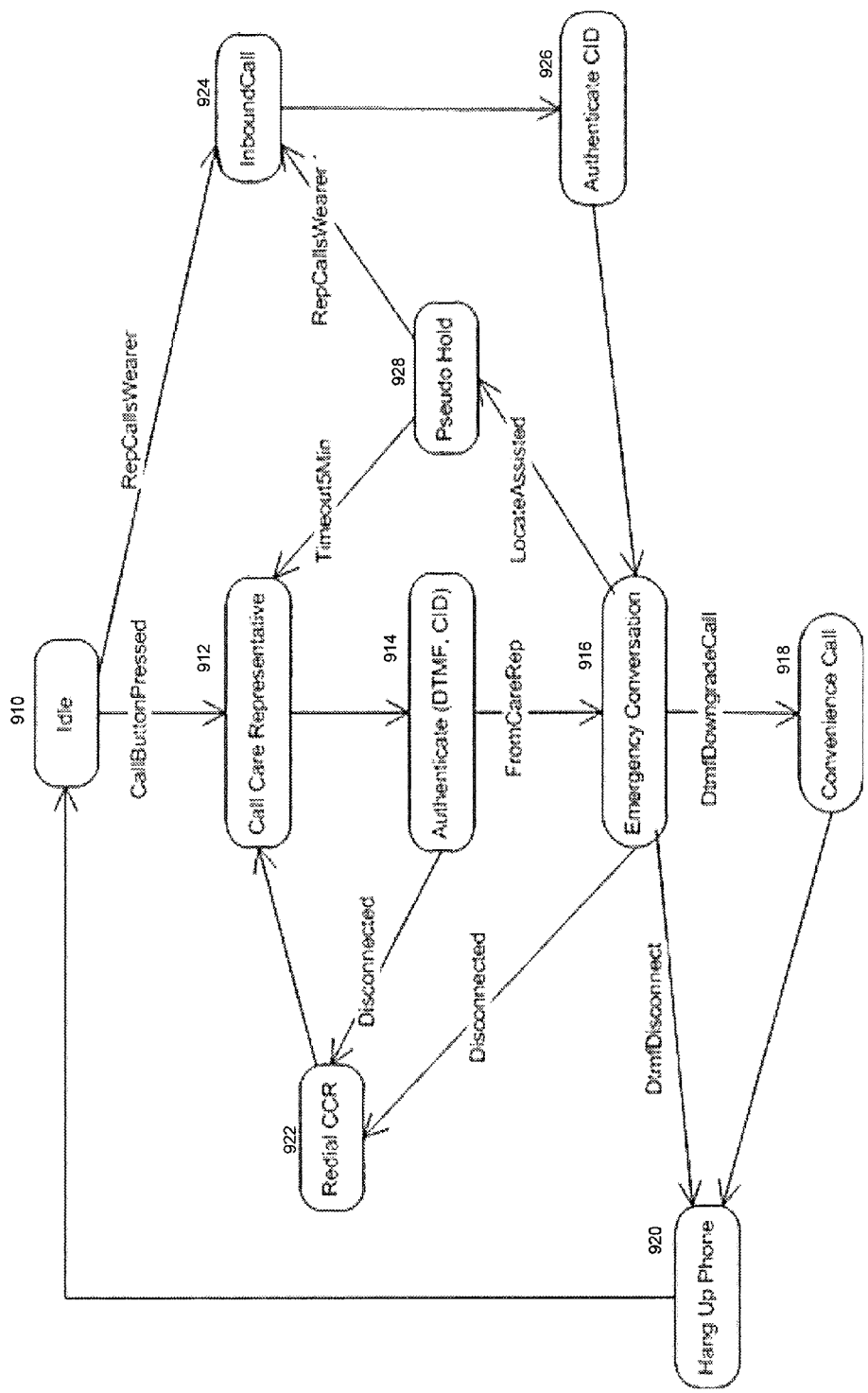
FIG. 5 illustrates an exemplary state diagram having a persistent mode.

FIGS. 4 and 5 illustrate an exemplary call flow and state diagram where the system provides a "persistent mode." In this example, a user has initiated an emergency call by actuating the smart button. Actuating the smart button causes the device to initiate a smart button function. The smart button function determines the state of the mobile device and changes it so that an emergency call can be made. These changes include turning off airplane mode and switching the device from standby mode to active mode. The smart button function may also enable other functions of the mobile device, for example, location services, that may be useful to first responders. Control of other elements of the mobile device may be transferred to the call center through the smart button function. For example, the call center agent may engage the pseudo-hold mode and initiate an IP session with the mobile device to receive audio data, still or moving image data, motion data from sensors integral to the mobile device, location data from a GPS unit and/or signals from a heart monitor coupled to the mobile device. The smart button function may cause the mobile device to automatically respond to any requests issued by the call center, for example, using https protocol. Alternatively, if the mobile device may establish a parallel IP session while the call is active, for example via a local Wi-Fi access point, the call center may cause the mobile device to establish such a session in order to provide the data from the mobile device while the call is in progress.

The emergency call is not severed until a determination is made that the call need no longer continue. For example, a user of a mobile device 113 is considered to be in an emergency state as soon as a PERS Call Center is contacted (e.g., either by user initiation or automatically by the mobile device 113 when the mobile device 113 senses an emergency situation). In this example, the user cannot sever the call with the Call Center until the Call Center sends an acknowledgment signal to the mobile device 113 indicating that the call can be severed. The Call Center may send such a "clear" signal upon determining that there is no true emergency or that the emergency is accommodated. This signal may be a combination of DTMF tones, for example, "*81." The requirement of a special code to clear the emergency makes it less likely that the user will accidentally send the "clear" signal while the emergency is still active. Alternatively, the application on the mobile device may allow the emergency to be cleared by emergency response personnel, for example by entering a special code on the keypad or touchscreen of the mobile device 113. When the mobile device 113 receives a "clear" signal, the state of the mobile device 113 changes from "emergency" to "normal," thereby allowing the connection to the call center to be severed at any point.

FIG. 4 illustrates an exemplary call flow diagram where the system operates in this persistent mode. In step 801, the mobile device 113 may initiate a call to the call center 302 during an emergency state. The call is initiated by a user actuating a smart button, e.g. a "Help" button on a wearable PERS type implementation of the mobile device 113. In another example, the smart button may be implemented upon a combination of a graphical user interface and sensors of the mobile device. Alternatively, the smart button may be implemented with a dedicated key/button on the mobile device 113 (e.g., 1132 in FIG. 6). In another example, the call is initiated automatically by the mobile device 113 when sensors in or connected to the mobile device 113 sense an emergency situation (e.g., a sudden acceleration of the mobile device 113). Once the smart button is actuated, the mobile device may enter into an emergency mode and may ignore any further pressing of other buttons in the mobile device 113 until the emergency is cleared.

In step 802, upon the initiation of the call, the application on the mobile device 113 determines whether the device is in a state that does not allow voice communication, for example an airplane mode or a standby mode. In these instances, the application terminates these modes so that a call may be made from the device to the call center 302. Next, the mobile device 113 may persistently try to connect the call until the call connection is established with the call center 302. In step 803, the call may be disconnected, for example, due to signal loss. In another example, the call may be disconnected due to the call center 302 accidentally hanging up the call. Yet in another example, the call may be disconnected due to a temporary line fault or loss of signal, for example, when the call is being routed through the docking station and that station's network connection fails. In each of these instances the mobile device repeatedly attempts to re-initiate the call to the call center in step 804 until a connection is reestablished.

In one example, the reestablishing of the call with the call center may be based on a back-off process. In this process, the mobile device may repeatedly attempt to make the connection for predetermined times separated by respective amounts of times generated by a pseudo-random timer (e.g., a pseudo-random number generator). In one example, the pseudo-random timer may be setup by the user. In another example, the processor of the mobile device may be configured to generate a pseudo random number, based on which, the timer may be setup.

The re-initiation may be prematurely terminated based on different criteria. One example of such a criterion is the preservation of battery life of the mobile device. For example, if the battery life of the mobile device is below a threshold, the user interface may display a message indicating that the battery life is below the threshold and the automatic re-initiation will be terminated in order to preserve the battery life of the mobile device.

Yet in another example, the re-initiation may be terminated based on a predetermined signal strength of the mobile device. For example, if the signal strength falls below a threshold signal strength, the user interface of the mobile device may display a message indicating that the call connection between the mobile device and the call center may not be established. The user interface may also display a message indicating that the user may want to move to a new position for an improved signal strength, for example.

At step 805, similarly to step 802, the mobile device may persistently call until a call connection is established with the call center. The emergency situation may be handled upon reestablishing the call with the call center in step 805. For example, a PERS agent may discuss the emergency situation with the user of the mobile device 113 and take actions accordingly. In step 806, upon handling the emergency situation, the call center 302 may then send a notification to the mobile device 113 indicating that the emergency situation has been handled. The call center may then send a clear command to the mobile device 113 to change the emergency state back to a normal state. As the mobile device 113 returns to the normal state, either the mobile device or the call center may sever the call connection.

FIG. 5 illustrates another exemplary flow diagram where the system provides persistent mode. At step 910 the mobile device 113 may be in an idle state. For example, as described earlier, during an idle state, the mobile device 113 is in a normal mode. At step 912, the mobile device initiates a call to the call center 302 and connects to a call care representative (CCR) responsive to an emergency condition. At step 914, the call center 302 may authenticate the user of the mobile device 113. If the user is not authenticated, depending on the nature of the emergency, may advise the caller to dial 911 or forward the call to a 911 service. In one implementation, authentication may be performed by asking the user of the mobile device 113 to enter a passcode by pressing a series of buttons or a series of virtual buttons on a touch-sensitive display on the mobile device 113. Upon matching the passcode with the stored passcode in the call center server 143, the user may be authenticated. In another example, the authentication may be performed by looking up a customer in a customer ID database (CID). For example, the call center representative may query the customer database (e.g. in server 143) to match the personal information of the user placing the call with an identification of the mobile device 113. Alternatively, the call center may perform authentication by automatically locating the user data in the customer database according to an identification of the mobile device 113. At this point, there may not be any interaction between the user and the call center. The phone number of the mobile device 113, in one example, may be the identification. Yet, in another example, biometrics may be used for authentication. Example biometrics may include a fingerprint scan, an iris scan, a retinal scan, a voiceprint or a preprogrammed motion on the touchscreen of the mobile device. If biometric authentication is used, the reference data may be obtained from the user upon registering with the service and stored on the server at the call center. For example, if a voiceprint is used for authentication, the user may be prompted, during the registration process, to select a word or phrase and repeat the word or phrase several times so that the system may generate a probabilistic model, for example a hidden Markov model based on extracted features.

Similar techniques may be used for iris or retinal pattern recognition or fingerprint recognition. In one implementation, the biometric data provided by the user is compared to the stored data to generate a probability of a match. Authentication occurs when this probability is greater than a threshold, for example 60 to 90 percent.

The system may be configured to perform different types of authentication based on the particular user or on the type of emergency. A user suffering from dementia, for example may not be able to interact with the mobile device. In this instance, authentication may be based only on the CID. Similarly, if the smart button is activated by a sensed fall or collision, by sensing entry to a dangerous area, using the GPS, or by a sensed heart attack, authentication may also be limited to comparison of the CID transmitted with the emergency call. If the user manually activates the smart button, however, the personnel at the call center may determine the type of authentication that is required based on a conversation with the user.

If the call is disconnected at any point during authentication, the mobile device 113 automatically redials the call care representative at step 922 and again repeats step 912.

However, upon authentication, at step 916, the user of the mobile device 113 may engage in an emergency conversation with the call care representative. For example, the user may seek personal medical attention at a specific geographical location. For example, the user may need directions to the nearest hospital. At step 928, the call center may then command the user device 113 to enter into pseudo hold mode, as described earlier, to locate the position of the mobile device 113. Upon determining the location of the mobile device 113, the mobile device may be again connected with the CCR.

The call may be accidently disconnected while having the emergency conversation. Any disconnection before the emergency is cleared is assumed to be accidental and will be reestablished. Thus, a redial to the CCR may be initiated in step 922. At this stage, since the determination of location has already been performed, a re-authentication of the user may not be needed. In one example, the CCR may determine that the redialed call is initiated from the previous caller based on the stored user ID and the call being received in a predetermined time interval, for example, zero to twenty minutes after the disconnection. In one embodiment, the CCR maintains a database of active emergencies and, when a call is prematurely terminated, attempts to reconnect during a first predetermined interval, for example two to five minutes, using a backoff algorithm or backoff generator with a relatively small delay, for example two to five seconds. After the first predetermined interval, the CCR may switch to a longer interval between calls, for example 10 to 30 seconds and continue to retry for a second predetermined interval, for example five to 20 minutes. The backoff interval may be a fixed value or may be determined by a pseudo-random number generator. If a call is received from the participating mobile device in either of these intervals, the emergency session is reestablished. In another example, the server of the CCR may be configured to indicate that certain information (e.g., authentication information) is obtained from the previous call, as such, re-authentication is not necessary. The re-authentication step is then skipped.

Any attempts to reconnect the call may also be dependent on the type of emergency. For a more critical emergency, attempts to reconnect may be made more frequently than for a less critical emergency. Furthermore more frequent attempts are made if data from the mobile device is needed, such as heart monitor signals, or video and/or audio data to provide an initial diagnosis of a condition such as angina or a stroke.

Alternatively, at step 920, upon receiving the emergency help, the user of the mobile device 113, may disconnect by pressing the smart button to change from the emergency state to the normal state. The mobile device may then move back to idle state 910 after terminating the call in step 920. The user may also send a request to downgrade the call to a convenience call after the emergency conversation in step 918. Upon receiving the request, the CCR may then downgrade the call. In one example, the CCR may verify with the user that the emergency should be cleared, prior to downgrading the call.

Figure 6:
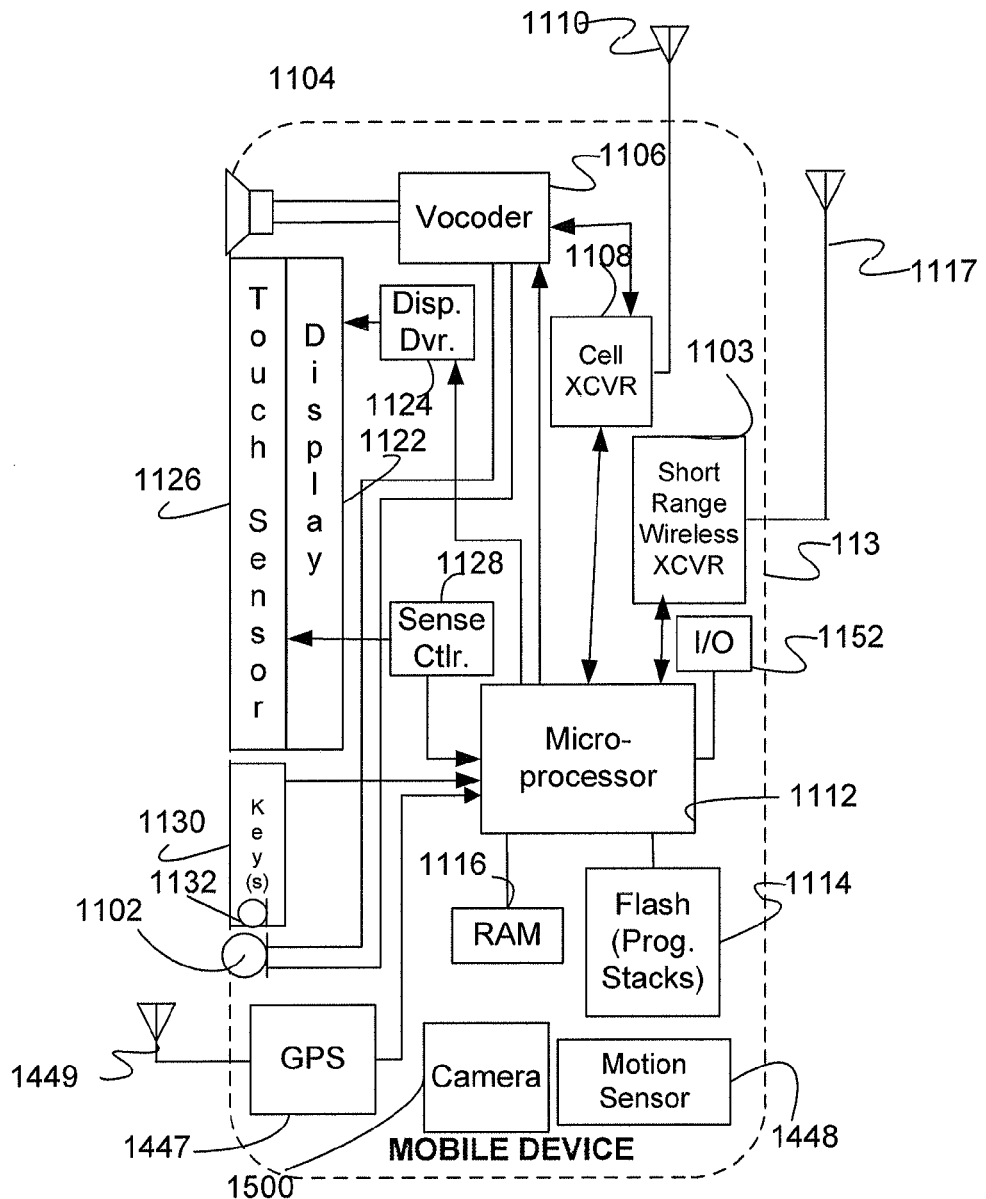
FIG. 6 illustrates a high level simplified function block diagram of an exemplary mobile device.

It may be useful to consider the functional elements/aspects of an exemplary mobile device, at a high-level. For purposes of such a discussion, FIG. 6 provides a block diagram illustration of an exemplary mobile device 113. Although the mobile device 113 may be a handset type mobile phone or may be incorporated into another device, such as a personal digital assistant (PDA), a tablet computer, a PERS wearable device, or the like. For discussion purposes, the illustration shows the mobile device 113 in the form of a handheld smart-phone. The smart-phone example of the mobile device 113 may function as a normal digital wireless telephone station. The mobile device 113 includes a display 1122 for displaying messages, location information, pseudo-hold messages, or the like, call related information dialed by the user, calling party numbers, etc. The mobile device 113 also includes a touch/position sensor 1126. The sensor 1126 is relatively transparent, so that the user may view the information presented on the user output (i.e., display) 1122. A sense controller 1128 sensing signals from elements of the touch/position sensor 1126 and detects occurrence and position of each touch of the screen formed by the display 1122 and sensor 1126. The sense circuit 1128 provides touch position information to the microprocessor 1112, which correlates that information to the information currently displayed via the display 1122, to determine the nature of user input via the screen.

The display 1122 and touch sensor 1126 (and possibly one or more keys 1130, if included) are the physical elements providing the textual and graphical user interface for the mobile device 113. The microphone 1102 and speaker 1104 may be used as additional user interface elements, for audio input and output. Of course, other user interface elements may be used, such as a trackball, as in some types of smart phones or tablets. As such, a smart button may be implemented by key 1132 or upon a combination of 1122 and 1126 forming a touch sensitive display of the mobile device 113. In addition, camera 1500 may be used to capture images and videos. It is contemplated that the mobile device may include an input/output interface, 1152, which may be connected to an external monitoring device, such as a heart monitor, blood pressure monitor, blood sugar monitor or a physiological or environmental sensor to automatically initiate an emergency call to the call center when signals from the heart monitor indicate the occurrence of an emergency event, such as a heart attack. Alternatively, these signals may be provided by the heart monitor to the processor 1112 via the short range wireless transceiver 1103.

For digital wireless communications, the mobile device 113 also includes at least one transceiver (XCVR), such as cellular transceiver 1108 and short range wireless transceiver 1103. The concepts discussed here encompass examples of the mobile device 113 utilizing any digital transceivers that conform to current or future developed digital wireless communication standards.

The transceiver 1108 provides two-way wireless communication of information, such as vocoded speech samples and/or digital message information, in accordance with the technology of the network 121. In this case, the transceiver 1108 also sends and receives a variety of signaling messages in support of the various voice and data services provided via the mobile device 113 and the wireless communication network 121. Transceiver 1108 connects through RF send and receive amplifiers (not separately shown) to an antenna 1110. In the example, the transceiver 1108 is configured for RF communication in accord with a digital wireless protocol, such as the CDMA and 3GPP protocols and/or 4G protocols.

Similarly, short range wireless transceiver 1103 is configured to send and receive a variety of signaling messages in support of the various voice and data services provided in home wireless network. Transceiver 1103 connects through send and receive amplifiers (not separately shown) to an antenna 1117.

The mobile device 113 also includes a GPS receiver 1447 for communicating with satellites via antenna 1449. The mobile device 113 may also include a haptic element (not shown) to provide haptic feedback to the user. Various combinations of the keypad 1120, display 1122, microphone 1102, haptic element, and speaker 1104 may be used as the physical input output elements of the graphical user interface (GUI), for multimedia (e.g., audio and/or video) communications. Of course other user interface elements may be used, such as a stylus and touch sensitive display screen, as in a PDA, tablet computer, PERS wearable device, or smart phone. In addition to normal telephone and data communication related input/output (including message input and message display functions), the user interface elements also may be used for display of notifications and other information to the user and user input of selections, for example, including any needed to place emergency calls and/or determine location. Additional sensors, such as an accelerometer, gyroscope, compass, light sensor, and barometer may also be included in the motion sensor 1448 of the mobile device 113. For example, the combination of sensor information, including sensors external to the mobile device 113, such as the heart monitor, helps determine (i) whether the user of the mobile device is in an emergency situation and (ii) whether the user may need help.

In the example of FIG. 6, a microprocessor 1112 serves as a programmable controller or processor, in that it controls all operations of the mobile device 113 in accord with programming that it executes, for all normal operations, and for operations involved in receiving/determining/transmitting location information and communicating with emergency services. In the example, the mobile device 113 includes flash type program memory 1114, for storage of various "software" or "firmware" program routines and mobile configuration settings, such as mobile telephone number (MTN or MDN), etc. The mobile device 113 may also include a non-volatile random access memory (RAM) 1116 for a working data processing memory. In a present implementation, the flash type program memory 1114 stores firmware such as a boot routine, device driver software, an operating system, call processing software and vocoder control software, and any of a wide variety of other applications, such as client browser software and short message service software. The memories 1114, 1116 also store various data, such as telephone numbers and server addresses, downloaded data such as multimedia content, and various data input by the user. Programming stored in the flash type program memory 1114, sometimes referred to as "firmware," is loaded into and executed by the microprocessor 1112. Accordingly, the mobile device 113 includes a processor, and programming stored in the flash memory 1114 configures the processor so that the mobile device is capable of performing various desired functions, including determining location information from GPS satellites and receiving assistance through AGPS, and the like.

As discussed above, functions relating to monitoring location information and providing assistance in determining the location information can be performed on one or more computers connected for data communication via the components of a packet data network, including mobile devices, in accordance with the methodology of FIG. 3. An exemplary mobile device 113 has been discussed above with respect to FIG. 6. Although special purpose devices may be used as the server(s), for example for any of the servers in FIGS. 1 and 2, such devices also may be implemented using one or more hardware platforms intended to represent a general class of data processing device commonly used to run "server" programming so as to implement the functions discussed above, albeit with an appropriate network connection for data communication.

Figure 7:
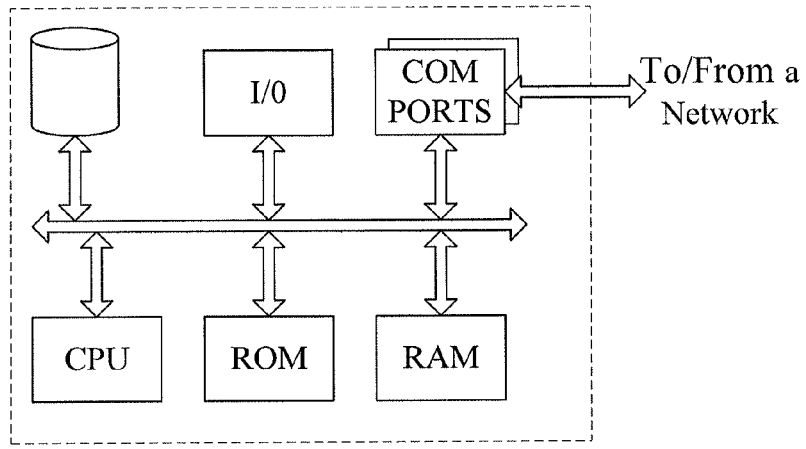
FIG. 7 illustrates a network or host computer.
Figure 8:
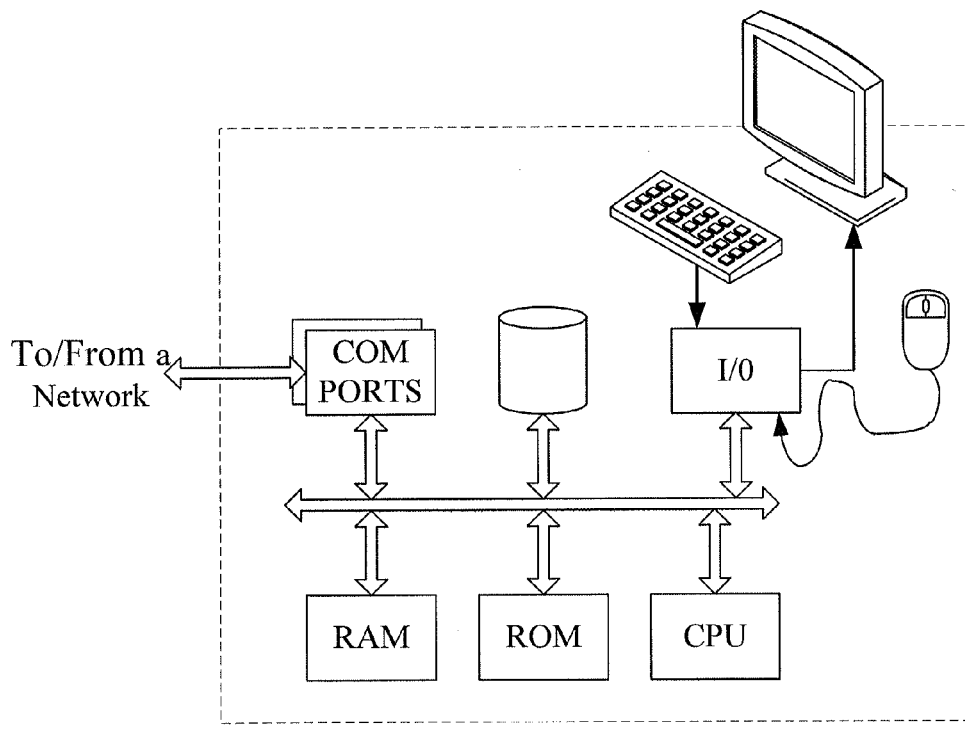
FIG. 8 depicts a computer with user interface elements.

FIGS. 7 and 8 provide functional block diagram illustrations of general purpose computer hardware platforms, as might be used as any of the servers discussed in the context of FIGS. 1 and 2, or other computers discussed in the examples above. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that programming and general operation of such computer equipment, and as a result the drawings, should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

For example, aspects of the methods determining location information of a mobile device and providing assistance in emergency situations, as outlined above, may be embodied in programming for a server and programming for a mobile device. Program aspects of the technology may be thought of as "products" or "articles of manufacture" typically in the form of executable code and/or associated data that is carried on or embodied in a type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    establishing a call to a call center based on activation of an emergency mode from a normal mode in a user equipment (UE) device;
    monitoring the established call while the UE device is in the emergency mode to determine whether the established call is disconnected from the call center; and
    responsive to detecting the disconnection and upon being in the emergency mode, repeatedly attempting, by the UE device, to reconnect the disconnected call to the call center until a reconnection is detected;
    wherein attempting, by the UE device, to reconnect the disconnected call to the call center includes repeatedly initiating outgoing calls to the call center and concurrently comparing identifying information of incoming calls to identifying information of the call center until the UE device is reconnected to the call center.

2. The method of claim 1, wherein the activation of the emergency mode is dependent on user activation via a smart button on the UE device.

3. The method of claim 1, wherein the activation of the emergency mode is dependent on sensors coupled to the UE device automatically sensing an emergency mode, wherein the sensors include at least one of an accelerometer, a barometer, a GPS unit, a glucose monitor and a heart monitor.

4. The method of claim 1, further comprising ignoring inputs to a user interface of the UE device while the UE device is in the emergency mode.

5. The method of claim 1, further comprising receiving a non-emergency status from the call center after the reconnection of the call with the call center, in response to the receipt of the non-emergency status, allowing the mobile device to disconnect the call.

6. The method of claim 1, further comprising disconnecting the call by the call center when it is determined that the emergency mode is to be cleared and switching from the emergency mode to the normal mode upon disconnecting the call.

7. The method of claim 1, wherein the attempting to reconnect the disconnected call includes on a back-off process that repeatedly attempts to reconnect for a predetermined time set by a backoff generator, wherein the backoff generator is responsive to a detected type of emergency to determine a frequency of the attempts to reconnect.

8. The method of claim 1, further comprising sending a request to the call center to downgrade the reconnected call.

9. The method of claim 1, wherein the establishing of the call to the call center includes switching the UE device to a mode in which voice calls are allowed.

10. The method of claim 9, wherein the switching includes automatically disabling an airplane mode and a standby mode for the UE device.

11. A user equipment (UE) device comprising:
    at least one network interface, configured to support connection via a communication network; and
    a processor coupled to the network interface configured to cause the UE device to perform functions, including functions to:
        establish a call to a call center via the communication network, based on activation of an emergency mode from a normal mode in the UE device;
        monitor the established call while the UE device is in the emergency mode to determine whether the established call is disconnected from the call center; and
        responsive to detecting the disconnection and the UE device being in the emergency mode, repeatedly attempt to reconnect the disconnected call to the call center until a reconnection is detected;
        wherein the processor configures the UE device to attempt to reconnect the disconnected call to the call center by repeatedly initiating outgoing calls to the call center and concurrently comparing identifying information of incoming calls to identifying information of the call center until the UE device is reconnected to the call center.

12. The UE device of claim 11, further comprises a smart button, and the processor is further configured to activate the emergency mode based on an activation of the smart button.

13. The UE device of claim 11, further comprises sensors, including an accelerometer, a barometer, a GPS unit and a heart monitor, configured to automatically sense an emergency mode and the processor is further configured to activate the emergency mode based on signals from the sensors indicating the emergency mode.

14. The UE device of claim 11, further comprises a pseudo random number generator, and the attempt to reconnect by the processor includes causing the processor to wait a predetermined time between attempts to reconnect, the predetermined time being set by a backoff generator, wherein the backoff generator is responsive to a detected type of emergency to determine the predetermined time.

15. The UE device of claim 11, wherein the processor is further configured to switch the UE device to a mode in which voice calls are allowed prior to establishing the call with the call center.

16. The method of claim 15, wherein the processor is configured to automatically disable an airplane mode and a standby mode for the UE device to switch the UE device to the mode in which voice calls are allowed.

17. Non-transitory, tangible, computer storage medium of a user equipment (UE) device having stored thereon an application for the UE device which the application is configured to cause a processor in the UE device to perform functions, including functions to:
- establish a call to a call center via the communication network, based on activation of an emergency mode from a normal mode in the UE device;
- monitor the established call while the UE device is in the emergency mode to determine whether the established call is disconnected from the call center; and
- responsive to detecting the disconnection and the UE device being in the emergency mode, repeatedly attempt to reconnect the disconnected call to the call center until a reconnection is detected;
- wherein the application configures the processor of the UE device to attempt to reconnect the disconnected call to the call center by repeatedly initiating outgoing calls to the call center and concurrently comparing identifying information of incoming calls to identifying information of the call center until the UE device is reconnected to the call center.

18. The non-transitory computer storage medium of claim 17, wherein the function of activation of the emergency mode is based on an activation of a smart button application.

19. The non-transitory computer storage medium of claim 17, wherein the function of activation of the emergency mode is dependent on sensors coupled to the UE device automatically sensing an emergency mode, wherein the sensors include at least one of an accelerometer, a barometer, a GPS unit, a glucose monitor and a heart monitor.

20. The non-transitory computer storage medium of claim 17, wherein the function of attempting to reconnect is based on a predetermined time set by a pseudo random number generator application.

\* \* \* \* \*